(12) United States Patent
Lin et al.

(10) Patent No.: US 7,352,814 B2
(45) Date of Patent: Apr. 1, 2008

(54) VIDEO ARTIFACT IDENTIFICATION AND COUNTING

(75) Inventors: Chien-Hsin Lin, Sunnyvale, CA (US); Chang-Ming Yang, San Jose, CA (US)

(73) Assignee: NXP B.V., Eindhoven (NL)

( * ) Notice: Subject to any disclaimer, the term of this patent is extended or adjusted under 35 U.S.C. 154(b) by 712 days.

(21) Appl. No.: 10/044,876

(22) Filed: Oct. 26, 2001

(65) Prior Publication Data

US 2003/0081835 A1 May 1, 2003

(51) Int. Cl.
*H04N 7/12* (2006.01)

(52) U.S. Cl. .................................... 375/240.29
(58) Field of Classification Search ............ 375/240.26, 375/240.29; 382/252, 268, 275; 348/425.1, 348/425.2, 606–607, 666
See application file for complete search history.

(56) References Cited

U.S. PATENT DOCUMENTS

| | | | | | |
|---|---|---|---|---|---|
| 4,885,636 | A | * | 12/1989 | Sullivan | 375/240.14 |
| 5,724,453 | A | * | 3/1998 | Ratnakar et al. | 382/251 |
| 6,266,102 | B1 | * | 7/2001 | Azuma et al. | 348/671 |
| 2001/0026283 | A1 | * | 10/2001 | Yoshida et al. | 345/600 |

FOREIGN PATENT DOCUMENTS

| EP | 0881837 A1 | * | 2/1998 |
|---|---|---|---|
| WO | WO 01 20912 | | 3/2001 |

OTHER PUBLICATIONS

Wu et al, "A Generalized Block–Edge Impairment Metric for Video Coding", IEEE Signal Processing Letters, vol. 4, No. 11, pp. 317–320, Nov. 1997.*

* cited by examiner

*Primary Examiner*—Vu Le

(57) ABSTRACT

Artifact detection and counting is enhanced using looping in both the horizontal and vertical direction is enhanced via a reduced bandwidth for accumulation of count values into count table entries. According to an example embodiment of the present invention, first and second loops are made for horizontal and vertical count table entries. Quotient and remainder values of a detected artifact value are used for increasing count table entries in the first looping pass, and the count table entries are increased using the quotient value in the second loop. The table increase in the first loop is limited to the length of the remainder value, and the table increase in the second loop is limited to the length of the row or column in the count table being used. In this manner, latency for additions to the count table and the bandwidth for making the additions are reduced, relative to conventional applications. In addition, each entry into the table can be reduced to one addition.

14 Claims, 2 Drawing Sheets

VIDEO ARTIFACT IDENTIFICATION AND COUNTING

FIELD OF THE INVENTION

The present invention is directed to video signal processing and, more particularly, to artifact detection in video signal processing.

BACKGROUND

Computer arrangements, including microprocessors and digital signal processors, have been designed for a wide range of applications and have been used in virtually every industry. For a variety of reasons, many of these applications have been directed to processing video data and have demanded minimal levels of power consumption and compactness. Some applications have further demanded a high-speed computing engine that can perform effectively on a real-time or near real-time basis. Many of these video-processing applications have required a data-signal processing circuit that is capable of performing multiple functions at ever-increasing speeds.

Various video applications, such as moving pictures experts groups (MPEG) applications, MPEG2 applications (e.g., all-digital transmission of video data at coded bitrates between about 4 and 9 Mbit/sec) and others employ compressed video data. Data compression is particularly useful in data processing and transfer because smaller amounts of data can typically be transferred faster and use a smaller bandwidth. However, data compression can sometimes produce errors resulting from lost data. The lost data typically shows up as a discrepancy, or artifact, in the video image. As data is compressed smaller, the occurrence of artifacts increases. In this regard, there is a tradeoff between increased compression and increased artifacts that occur as a result of the compression.

Video images created using compressed data may include several artifacts without significantly affecting image quality or at least without reducing the image quality below a particular level of acceptability. In certain video processing applications, an acceptable count, or number, of artifacts is selected and the compression of video data is controlled so that the artifact count is maintained within an acceptable range. In these applications, it is generally useful to count and/or identify the artifacts for taking corrective or other action in response to the count.

In video sequences that use MPEG2 compressed and decompressed data, several types of artifacts can be found. These sequences typically employ an encoding format such as 8×8 (MPEG2), 8×10 (540 or 528 pixels), or 8×12 (480 pixels) formats. Due to problems related to issues such as quantization of 8×8 block discreet cosine transform (DCT) coefficients or poor encoded results, artifacts can be amplified through processes such as contrast or sharpness enhancement. In these and other instances, noticeable blocking artifacts can be identified and are commonly referred to in connection with the blockiness of a particular video sequence. Blocking artifacts commonly show up momentarily as artificial rectangular discontinuities in a decompressed decoded image. The visibility of the blocking artifacts generally depends on the amount of compression used, the quality and nature of the original pictures as well as the quality of the coder used. The visible blocks may include 8×8 DCT blocks or misplaced blocks (e.g., 16×16 pixel macroblocks) due to the failure of motion prediction and/or estimation in an MPEG coder or other motion vector system, such as a standards converter. It is desirable to take corrective actions to reduce the visibility of these artifacts.

The present invention is directed to goals including the above-mentioned and the detection of artifacts in MPEG2 and other types of video data processing.

SUMMARY OF THE INVENTION

Various aspects of the present invention are directed to artifact detection in video data processing, and in a more specific application to artifact identification and counting.

Consistent with one specific example embodiment, the present invention is directed to artifact detection and counting that includes the use of two loops in each of a horizontal and vertical direction in a data table to accumulate a count of detected artifacts. The loops are effected in a manner that addresses challenges, including those discussed above, related to artifact detection and video data management.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
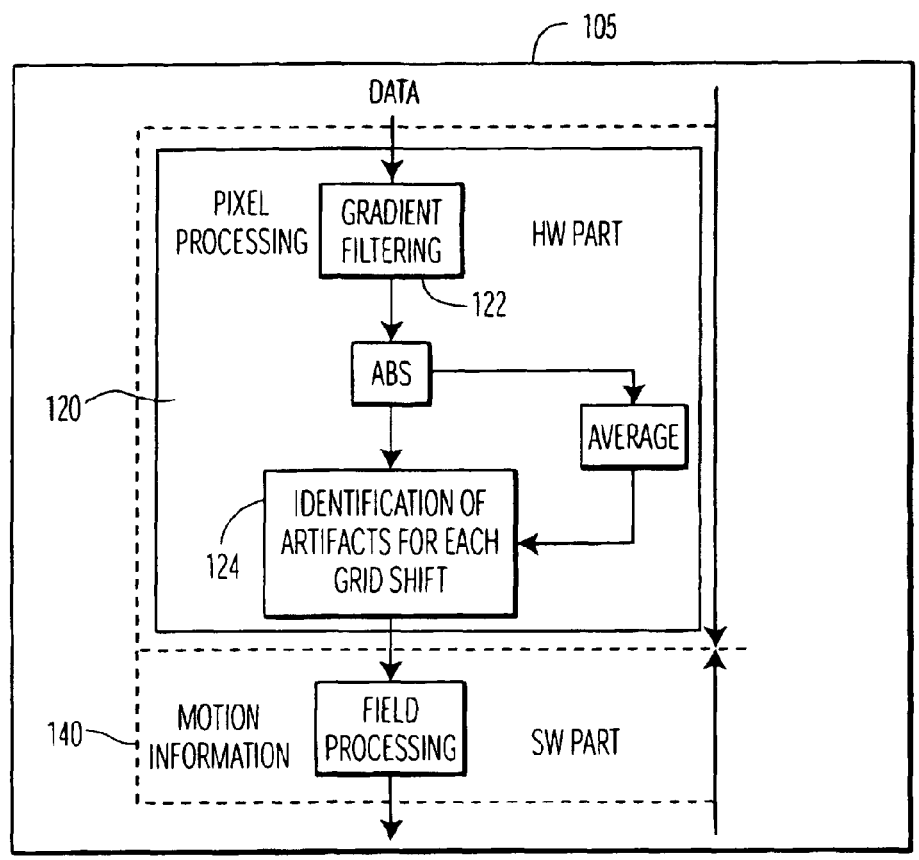
FIG. 1 shows artifact detection and counting, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EXAMPLE EMBODIMENTS

The present invention is believed to be highly applicable to methods and arrangements for artifact detection in video data processing, such as in MPEG2 processing. The invention has been found to be particularly advantageous for video data processing using data compression and that is susceptible to artifacts. While the present invention is not necessarily limited to such applications, an appreciation of various aspects of the invention is best gained through a discussion of examples in such an environment.

In one example embodiment of the present invention, artifacts in a video data sequence are detected and counted using a two-part algorithm employing two scanning loops in each of the horizontal and vertical directions to accumulate artifact count values in an artifact count table. The count table is updated (increased) when an unwanted artifact, such as contouring, is detected for either a horizontal or vertical artifact. A first loop is scanned across the table and uses quotient and remainder values of contour from a software application to increase entries in the count table, up to a maximum length of the remainder value. A second looping pass increases artifact entries in the table with the quotient value of contour, less one, and up to the end of the row or column of the table being looped through. The artifact detection is implemented using relatively low-cost hardware and exhibits relatively small bandwidth and latency.

The present invention may be implemented in connection with a variety of applications. FIG. 1 shows one such implementation in which the artifact counting of the present invention is employed. An MPEG2 artifacts detection unit is adapted to detect the existence of artifacts in video sequences using gradient tests in both horizontal and vertical directions. An output from the detection unit represents an indication of blockiness in scanning the active region of pixel processing and of the grid size and origin of artifacts. Scanned data 105 is processed in an MPEG2 artifacts detection algorithm consisting of pixel and field processing 120 and 140, respectively. The pixel processing is divided into gradient filtering 122 and identification of blocking artifacts 124. The identification of artifacts is divided into three steps including testing, artifacts counting and grid size counting. The gradient filtering and identification of blocking artifacts is implemented in hardware. The field processing includes blockiness and grid size procedures. The blockiness procedures are used by block level indication and grid position processing, and the grid size is determined using grid count values from MMIO registers to perform the calculation for a new grid size. The field processing is implemented in software design.

The artifacts counting is based on test conditions of gradient values or neighboring pixels in horizontal or vertical directions. If the gradient condition is met, there is an artifact existing in the pixel. Horizontal (test_H) and vertical (test_V) artifact test values determine the increment of the count values within an artifact count table for horizontal and vertical testing. The output values for the artifacts count table are stored to memory and the grid count is stored to MMIO registers. The field processing is adapted to access the stored values through registers.

In horizontal artifact counting, the length of artifacts existing in the horizontal direction (contour_H) is defined as:

contour_*H*=contour_*H*_*Q*\*PREVIOUS_GRID_SELECT+contour_*H*_*R*, where contour_H_Q is the quotient of the contour_H and PREVIOUS_GRID_SELECT, which is the predicted grid size (e.g., 8, 10, or 12); and where contour_H_R is the remainder of the contour_H. Once the length of horizontal artifact is assigned, the counting bounds are determined as from [PREVIOUS_GRID_SELECT, contour_H]. Horizontal entries in the artifacts count table are not incremented when the counting value is out of bounds (e.g., higher or lower than set bounds for the table). If the count value is within the range of bounds, the artifacts count table increments its entries until the decrement of count value reaches a lower bound.

In vertical artifact counting, the count value for vertical artifacts is incremented in a similar manner to that of horizontal artifact counting. The length artifacts existing in the vertical direction (contour_V) is defined as:

contour_*V*=contour_*V*_*Q*\*8+contour_*V*_*R*, where contour_V_Q is the quotient of the contour_V and contour_V_R is the remainder. Once the length of the vertical artifact is set, the counting bounds are determined from [8, contour_V]. The artifacts count table does not increment its vertical entries when the counting value is out of bounds, and if the count value is within the range of bounds, the artifacts count table increments its entries until the decrement of count value reaches a lower bound.

The maximum count accumulation cycle time is completely independent of the contour values and the additions cycles are also reduced. By using the quotient and remainder of contour values from a software application, the artifacts identification and counting are reduced from a conventional [contour_H_R, contour_H_Q*PREVIOUS_GRID_SELECT+contour_H_R] to [contour_H_R, PREVIOUS_GRID_SELECT] for horizontal counting and from [contour_V_R, contour_V_Q*8+contour_V_R] in conventional applications to [contour_V_R,8] vertical counting (where a vertical grid size of 8 is used).

In one particular example embodiment of the present invention, the horizontal count storing cycle of upper bound ratio is given as:

$$\frac{\text{PREVIOUS\_GRID\_SELECT}}{\text{PREVIOUS\_GRID\_SELECT} \cdot \text{contour\_H\_Q} + \text{contour\_H}}$$

where PREVIOUS_GRID_SELECT is 8, 10, or 12. And the vertical count storing cycle time of upper bound ratio is given as:

$$\frac{8}{8 \cdot \text{contour\_V\_Q} + \text{contour\_V}}.$$

Figure 2:
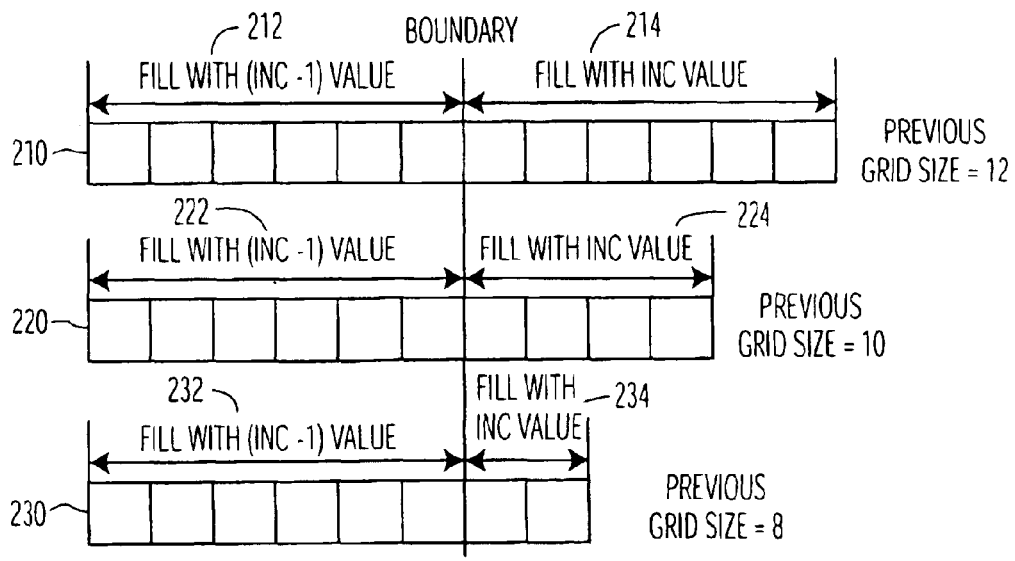
FIG. 2 is a horizontal grid for artifact counting, according to another example embodiment of the present invention.

The row or column entries for the table are divided into two groups for storing the values for incrementing (inc) or (inc−1). FIG. 2 shows example table sizes for the horizontal direction, with grid portions 210, 220 and 230 corresponding to previous grid sizes of 12, 10 and 8, respectively. Portions 212, 222 and 232 correspond to the inc−1 values, and portions 214, 224 and 234 correspond to the inc values. The increment value for horizontal direction is defined as:

$$inc = \frac{count\_value}{previous\ select\ grid\ siz},$$

where the count value is the horizontal count value, and the boundary point is defined as:

boundary=count value % previous select grid size.

Figure 3:
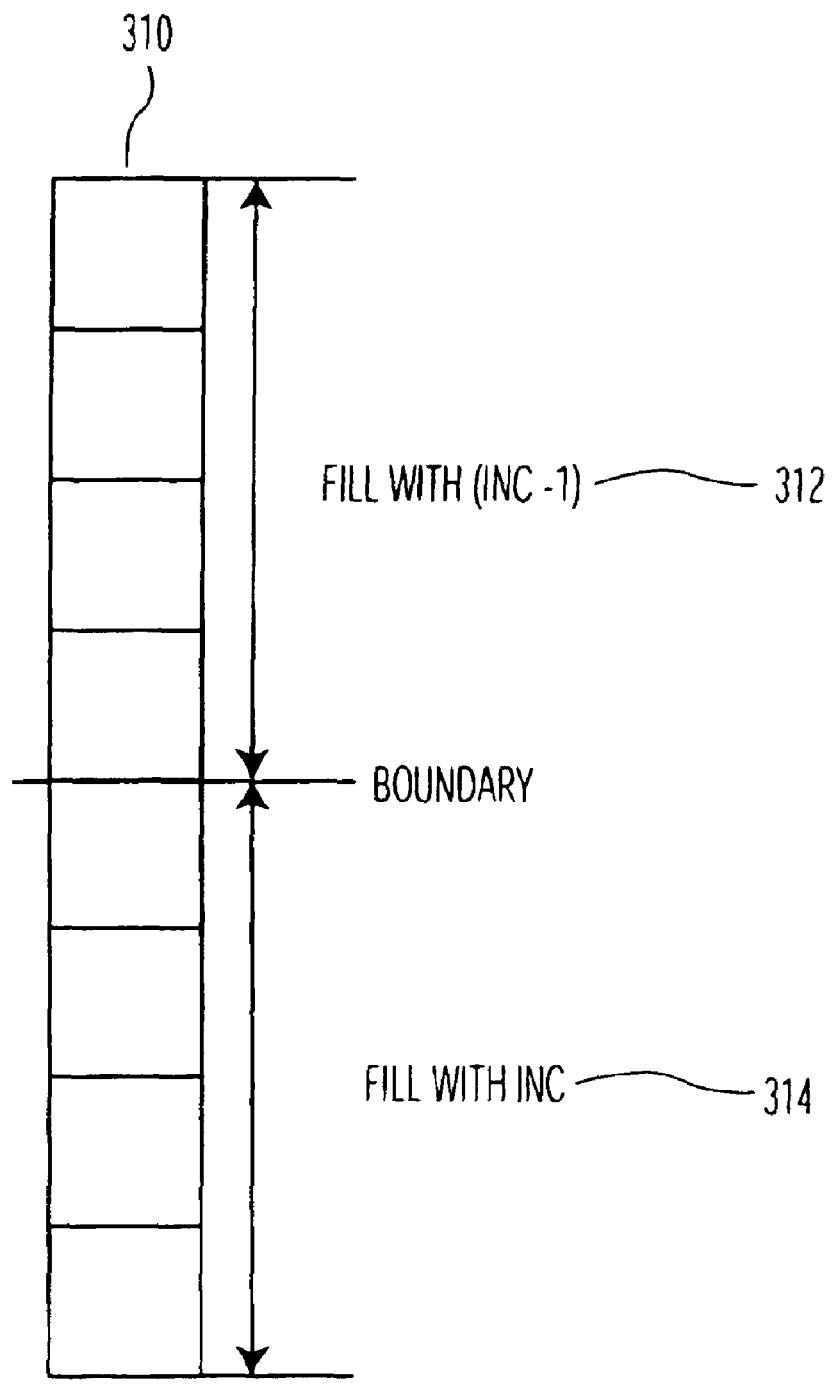
FIG. 3 is a vertical grid for artifact counting, according to another example embodiment of the present invention.

FIG. 3 shows an example table size (8) with grid portion 310 for vertical artifacts storing, with portions 312 and 314 corresponding to inc−1 and inc values, respectively. The boundary is the remainder and the increment value for the vertical direction is defined as:

$$inc = \frac{count\_valu}{8},$$

and the boundary for vertical direction is also defined as:

boundary=count value % 8.

The original bandwidth for storing the count values into entries depends on the contour values. The maximum bandwidth for storing the count values can be accomplished with only processing one row or one column once. This is particularly useful for reducing the bandwidth required, as compared to conventional applications, where the contour values are set to large number. In addition, the boundary for two types of additions for entries can be automatically wrapped around within the artifacts count table.

For more information regarding uses and implementations of the present invention, reference may be made to the attached appendix, entitled "A new artifact identification and counting method for MPEG2 artifact detection in Quality Video Input," which is fully incorporated herein by reference.

The present invention should not be considered limited to the particular examples described above. Various modifications, equivalent processes, as well as numerous structures to which the present invention may be applicable fall within the scope of the present invention, as fairly set forth in the appended claims.

What is claimed is:

1. A method for artifact detection and counting in a video signal processing circuit having a count table, the method comprising using first and second loops for each of horizontal and vertical count table entries, the first loop being adapted to increase the count table entries up to the length of a remainder value of a detected artifact value and the second loop being adapted to increase the count table entries using a quotient value of a detected artifact value.

2. The method of claim 1, wherein using first and second loops in a horizontal direction comprises:

defining a length of artifacts in the horizontal direction in a video image using the equation contour_H= (contourH_Q×PREVIOUS_GRID_SELECT+ contour_H_R), wherein contour_H is the length value of the artifacts, contourH_Q being a quotient value and contour_H_R being a remainder value;

performing the first looping pass of a video data pixel block and increasing an entry in the count table in response to quotient and remainder values of contour_H, the count table entry being increased to a value not exceeding the remainder value; and performing the second looping pass of the video data pixel block and increasing the remainder values of artifact entries with a value equal to the quotient value−1 and not exceeding the end of a horizontal row.

3. The method of claim 2, wherein using first and second lops for horizontal count table entries includes using an incremental value inc defined by the equation inc=contour_H/PREVIOUS_GRID_SELECT.

4. The method of claim 1, wherein using first and second loops in a vertical direction comprises:

defining a length of artifacts in the vertical direction in a video image using the equation contour_V=contour_V_Q*8+contour_V_R, wherein contour_V is the length value of the artifacts, contour_V_Q being a quotient value and contour_V_R being a remainder value;

performing the first looping pass of a video data pixel block and increasing an entry in the count table in response to quotient and remainder values of contour_H, the count table entry being increased to a value not exceeding the remainder value; and performing the second looping pass of the video data pixel block and increasing the remainder values of artifact entries with a value equal to the quotient value−1 and not exceeding the end of a vertical column.

5. The method of claim 4, wherein using first and second lops for vertical count table entries includes using an incremental value inc defined by the equation inc=contour_V/8.

6. The method of claim 1, wherein the vertical size of the count table entries is eight.

7. The method of claim 1, wherein the horizontal size of the count table entries is eight.

8. The method of claim 1, wherein the horizontal size of the count table entries is ten.

9. The method of claim 1, wherein the horizontal size of the count table entries is twelve.

10. The method of claim 1, further comprising defining a boundary for the size of at least a portion of a loop.

11. The method of claim 10, wherein defining a boundary includes defining an upper boundary.

12. The method of claim 10, wherein defining a boundary includes defining a lower boundary.

13. The method of claim 10, wherein defining a boundary includes effecting a wrap around within the count table.

14. The method of claim 1, wherein the count table entries is increased using only one addition.

* * * * *